Nov. 4, 1969  C. J. B. FINCHAM  3,476,557
ELECTRICAL DEVICE
Filed Dec. 31, 1964

United States Patent Office 3,476,557
Patented Nov. 4, 1969

3,476,557
ELECTRICAL DEVICE
Christopher J. B. Fincham, Boston, Mass., assignor to National Research Corporation, Cambridge, Mass., a corporation of Massachusetts
Continuation-in-part of applications Ser. No. 3,896, Jan. 21, 1960, and Ser. No. 38,818, June 27, 1960. This application Dec. 31, 1964, Ser. No. 425,376
Int. Cl. B22f *3/10;* H01g *9/05*
U.S. Cl. 75—222          3 Claims

ABSTRACT OF THE DISCLOSURE

A high capacitance, high reliability tantalum capacitor is formed by the two step sintering of fine tantalum powder, the first sintering step being conducted in a mold which confines a loosely disposed mass of the powder with a low bulk density. The second sintering step is conducted outside of the mold in a vacuum furnace to give a higher capacitance and lower leakage than can be obtained by normal sintering techniques.

---

This invention relates to an electrical device and more particularly to a porous capacitor anode and the method of its manufacture. This application is in part a continuation of my copending applications Ser. No. 3,896, filed Jan. 21, 1960 and Ser. No. 38,818, filed June 27, 1960, both now abandoned.

It is a principal object of the present invention to provide a method of manufacturing an improved capacitor anode.

Another object of the present invention is to provide a method of producing a sintered tantalum pellet having a low density and extremely high porosity for use as an anode in electrolytic capacitors.

Another object of the present invention is to provide a method of producing a tantalum anode having an extremely high capacitance per unit volume and per unit weight.

A still further object of the present invention is to provide a simple process for forming a tantalum anode from tantalum powder of extremely small particle size for use in the production of a capacitor having a high capacitance per unit volume of tantalum together with a low equivalent series resistance (hereinafter referred to as ESR).

A still further object of the invention is to provide a process for producing tantalum anodes having very high capacitance with good reliabiliy and with the other electrical characteristics being satisfactory.

Still another object of the invention is to provide capacitor anodes having extremely high reliability with reasonably high capacitance.

Other objects of the invention will in part be obvious and will in part appear hereinafter.

The invention accordingly comprises the product possessing the features, properties, and the relation of components and the process involving the several steps and the relation and order of one or more of such steps with respect to each of the others which are exemplified in the following detailed disclosure and the scope of the application of which will be indicated in the claims.

In practicing the present invention, in a preferred form thereof, the capacitor anode is formed by introducing a finely-powdered, film-forming material (such as tantalum or niobium) into a mold and heating the powder to form a coherent self-supporting pellet. The first heating step is preferably carried out under conditions which do not completely form the anode but only provide sufficient cohesion between the particles so that the pellet can be removed and handled as a unit. Thereafter the pellet can be removed from the mold and subjected to a further sintering treatment under vacum during which the pellet is heated to a temperature of 1875° C. and above to form a sintered, porous pellet which can be anodized to provide a high-capacitance, low-leakage anode. In a preferred embodiment of the invention, the initial sintering takes place for about 20 minutes at a temperature of about 1400° C. to 1500° C. The final sintering temperature and time will vary depending upon the most critical characteristic desired in the final capacitor. Thus, for example, when high reliability is of utmost importance, the temperature and time are extended (e.g. the temperature may be as high as 2350° C. and the final sintering time may be as long as 45 minutes). When maximum capacitance per gram is the objective, the final sintering temperature is preferably about 1875° C.–1950° C. and the sintering time is only about 30 mintues.

For a fuller understanding of the nature and objects of the invention, reference should be had to the following detailed discussion thereof taken in connection with the accompanying drawing in which.

In the production of capacitors having sintered tantalum anodes, it has been ascertained that the capacitance per unit weight, with a given batch of tantalum powder, is inversely proportional to the density of the pellets from which the sintered anode is formed for a given condition of sintering. The capacitance also decreases with increasing sintering temperature and time. It has also been ascertained that the ESR decreases with decreasing density of the pellet. Heretofore, to obtain maximum capacitance per unit weight and minimum ESR, it was necessary to compress the powder to a pellet having a density which was at the minimum consistent with sufficient pellet strength to resist the handling incident to the subsequent vacuum sintering operation. This minimum practicable density thus determined, and limited, the highest obtainable capacitance per unit weight and lowest obtainable ESR for a given powder for anodes made by prior art techniques (for a given set of sintering conditions).

Figure 1:
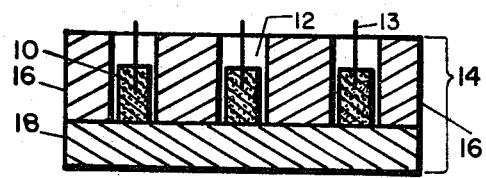
FIG. 1 is a cross-sectional view of the mold sintering support for making the tantalum anodes.
Figure 2:
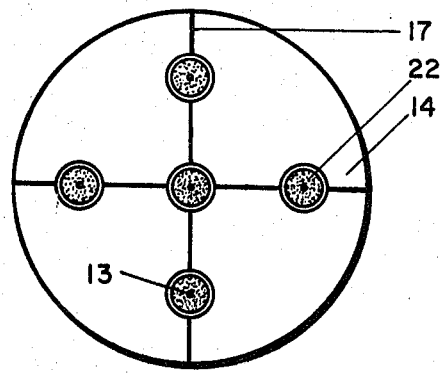
FIG. 2 is a top view of the mold sintering support for making the tantalum anodes.
Figure 3:
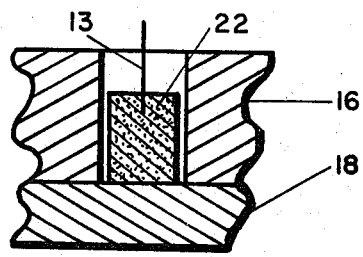
FIG. 3 is a fragmentary enlarged sectional view of a recess in the mold sintering support for making a tantalum anode showing the anode as it appears after sintering.

Referring to the drawings, there is illustrated in FIGS. 1, 2 and 3 one preferred apparatus and process for practicing the present invention. A measured quantity of tantalum metal powder 10 is shown in a vertical cylindrical recess 12 formed in a metal support 14 which serves as a mold for sintering the metal powder. A tantalum lead wire which is inserted into the tantalum powder is illustrated at 13. The mold support 14 preferably comprises an upper member 16 which is a cylindrical section consisting of tantalum metal. In member 16, cylindrical recesses 12 are preferably formed by drilling so as to serve as the mold chambers. A bottom member 18 is shown as a plate of tantalum metal which is separable from member 16 and forms the base of the mold chambers 12.

In the preferred form illustrated the upper chamber 16 is suitably cut, as at 17, to provide for ease of separation to permit ready removal of the sintered anodes. The various sections can be suitably held together by a clamp (not shown) for ease of handling as a complete mold assembly as indicated at 14. While this is a preferred form, a solid upper member 16 having the cylindrical recesses would be equally suitable. A desired amount of tantalum powder 10 is poured into each mold chamber 12 and a lead wire 13 is inserted in the mass of powder.

This powder may be lightly tamped to assure good contact with the lead wire, but the tamping is not sufficient to compact the powder substantially from the maximum volume that can be assumed by the free, unsintered powder. The mold assembly 14, containing the tantalum powder, is then placed in a vacuum sintering furnace, only for a time and at a temperature sufficient to form a coherent pellet. After this step the pellet is removed and then subjected to a further sintering operation.

When the first sintering operation is complete the mold assembly 14 is cooled and then removed from the furnace. Where the upper member 16 is sectional, the sections are disassembled and the sintered anodes are removed. When the upper member 16 is not sectional, but a single member, it is removed, separated from the base 18 and the sintered anodes are pushed out of the recesses with a plunger.

The invention will now be described by way of specific non-limiting examples thereof.

EXAMPLE 1

The tantalum metal powder used had an average particle size on the order of 25 to 30 microns, the preponderance of the powder having a particle size between 5 and 30 microns. The powder was also substantially free of all volatiles which could be released in a vacuum at 500° C. The individual particles of this powder were generally solid and roughly spherical in shape. They did not include many sintered agglomerates nor stringy particles. A fraction having a particle size of about 5 to 10 microns was separated, using a Roller particle size analyzer (Cat. No. 5–451, American Instrument Company). This 5 to 10 microns fraction had an uncompacted minimum bulk density of about 5.0 gm./cc. 1.8 grams of this tantalum powder fraction was loosely disposed in a ¼ inch diameter by ½ inch long cylindrical mold chamber in a tantalum support. The bulk density of the powder so disposed was approximatley 5.0 gm./cc. A tantalum lead wire was next inserted in the tantalum powder. The tantalum support containing the tantalum powder and lead wire was then introduced into the vacuum sintering furnace. The initial sintering was carried out for a period of ¼ hour at a pressure between about $5 \times 10^{-3}$ and $12 \times 10^{-3}$ microns Hg abs., and at a temperature of about 2150° C. The coherent pellet thus formed was then removed from the mold after cooling. The next step was to place the pellet on a tray and introduce it into the final vacuum sintering furnace for further sintering for a period of ½ hour at a pressure of between about $5 \times 10^{-3}$ and $12 \times 10^{-3}$ microns Hg abs. and at a temperature of about 2150° C. These sintering conditions prevent the density of the sintered mass from rising above 10 gm./cc. The next step was to form an oxide film having dielectric properties, on the sintered tantalum electrode. This was done by anodic oxidation of the pellet in a 0.01% phosphoric acid solution at 90°±2° C. at an approximate constant current density of 35 milliamps per gram of pellet weight until the desired voltage of 200 was reached after which the formation, at constant voltage, was continued for 2 hours, following which it was rinsed for 30 minutes in distilled water and dried. The electrical characteristics of the anodized pellet are reported in the table. The standard conditions of measurements of D.C. leakage, capacitance, and ESR (referred to in the specification and claims as "standard ESR conditions" etc.), were done using 10% phosphoric acid at room temperature as electrolyte and a cylindrical platinized silver cathode 1.5 inches in diameter and 2 inches in height. D.C. leakage was measured after 2 minutes at 140 volts and capacitance and ESR were measured at 120 cycles per second with a 0.5 volt A.C. signal. An impedance bridge (for example, Type 1650–A, General Radio Company) was used to measure the dissipation factor (D) and capacitance (C); and the ESR was calculated using the relationship $$ESR = \frac{D}{2\pi FC}$$

where C is the capacitance (in farads), F is the frequency of the A.C. signal (in cycles/second), and ESR is given in ohms. Breakdown voltage was measured by continuing the "forming step" (i.e. the anodic oxidation of the pellet in 0.01% $H_3PO_4$ at 90°±2° C. at constant current density of 35 ma./gm.) until breakdown of the dielectric film occurred.

EXAMPLE 2

In this example, the tantalum powder used was similar to that of Example 1 but had an average particle size of 4.5 microns (Fisher number) with a preponderance of the particle size between 5 and 15 microns (Roller analyser). This powder had an uncompacted minimum bulk density of about 3.0 gm./cc. 1.8 grams of this powder was loosely disposed in the same mold as used in Example 1. The bulk density of the powder so disposed was approximately 4 gm./cc. A tantalum lead wire was next inserted in the tantalum powder. The tantalum support containing the tantalum powder was then introduced into a vacuum sintering furnace. The initial sintering was carried out for a period of 20 minutes at a pressure between about $5 \times 10^{-3}$ and $12 \times 10^{-3}$ microns Hg abs. and at a temperature of about 1400 to 1500° C. The coherent pellet thus formed was then removed from the mold after cooling. The pellet was then placed on a tray and introduced into the vacuum sintering furnace for further sintering for a period of ½ hour at a pressure of between about $1 \times 10^{-4}$ and $10 \times 10^{-5}$ microns Hg abs. and at a temperature of 2000° C. The sintered pellet was then anodized and tested electrically by the same "standard conditions" as outlined in Example 1. The results of the electrical test are reported in Table II.

EXAMPLE 3

In this example the tantalum powder used had an average particle diameter of 10 microns and a particle size distribution of between 62 microns and 5 microns. This powder had been obtained by hydriding and grinding tantalum chips. 1.8 grams of the tantalum powder were loosely disposed in the same mold as used in Examples 1 and 2. The tantalum powder so disposed was sintered at a temperature of about 1500° C. for 20 minutes as in Example 2. It was then removed, as a coherent body, from the mold and sintered at about 2150° C. for ½ hour at a pressure of between about $1 \times 10^{-4}$ and $1 \times 10^{-5}$ microns Hg abs. The resultant pellets were formed to 270 volts instead of 200 volts as described in Example 1. The 270 volt formation test consists of forming anodes at a current density of 35 ma./gm. in 0.01% $H_3PO_4$ at 92° C. to 200 volts. The voltage is held at 200 volts until the current decays to ⅓ of the original value. Formation is then continued at constant current to 270 volts and terminated after a one-hour hold period. The D.C. leakage is measured in 0.01% $H_3PO_4$ at 25° C. at a test voltage of 240 volts. Capacitance is measured in 10% $H_3PO_4$.

Additional anode pellets were produced in accordance with the procedures outlined above in Examples 2 and 3. A number of important parameters concerning those anodes, along with Examples 1, 2 and 3, are given in Table I below. In this connection, the average particle diameter is expressed as Fisher Average Particle Diameter (FAPD) as more fully described in "Ind. Eng. Chem. Anal.", Ed. 12, 479–482 (1940), E. L. Gooden, and C. M. Smith. The "Powder Type" refers to source of the tantalum powder; "D" means powder resulting from the reduction of potassium fluotantalate by sodium; "H" means powder resulting from the hydriding, grinding and dehydriding of tantalum chips.

TABLE I

| Example | Fisher Average Particle Diameter (μ) | Powder Type | Final Sinter Temp., °C. | Final Sinter Time, minutes | Sinter Density | Formation Voltage |
|---|---|---|---|---|---|---|
| 1 | 4.5 | D | 2,150 | 30 | 8.6 | 200 |
| 2 | 4.5 | D | 2,000 | 30 | 8.34 | 200 |
| 3 | 9.5 | H | 2,150 | 30 | 11.3 | 270 |
| 4 | 9.5 | D | 2,350 | 45 | 7.5 | 270 |
| 5 | 6.5 | H | 2,150 | 30 | 10.6 | 200 |
| 5A | 6.5 | H | 2,150 | 30 | 11.0 | 200 |
| 6 | 4.5 | H | 2,000 | 30 | 10.1 | 200 |
| 7 | 6.5 | H | 2,025 | 30 | 9.1 | 200 |
| 8 | 9.5 | D | 2,150 | 30 | 6.4 | 200 |
| 8A | 9.5 | D | 2,150 | 30 | 9.5 | 200 |
| 9 | 9.5 | D | 2,200 | 45 | 7.2 | 270 |
| 10 | 6.0 | D | 2,200 | 45 | 9.7 | 270 |
| 11 | 4.5 | D | 2,000 | 30 | 8.2 | 200 |
| 12 | 4.5 | D | 1,950 | 30 | 8.0 | 200 |
| 12A | 4.5 | D | 1,900 | 30 | 9.6 | 200 |
| 13 | 4.5 | H | 1,875 | 30 | 9.8 | 200 |

The sintered and formed anodes described in Table I above were tested as described in Examples 1 and 3 above. The results of such tests are given in Table II below.

TABLE II

| Example | C | C¹ | CV | Df | ESR | L/C¹ | BDV |
|---|---|---|---|---|---|---|---|
| 1 | 18.0 | 155 | 3,600 | 12.2 | 6.0 | 0.07 | |
| 2 | 20.7 | 172 | 4,140 | 17.3 | 6.2 | 0.110 | 234–270 |
| 3 | 7.6 | 86 | 2,050 | 12.4 | 8.6 | .27 | >300 |
| 4 | 10.8 | 81 | 2,160 | 6.4 | 5.8 | .25 | 255 |
| 5 | 12.5 | 132 | 2,500 | 21.3 | 9.2 | .06 | >300 |
| 5A | 10.8 | 118 | 2,150 | 17 | 12.0 | .07 | 310 |
| 6 | 15.4 | 156 | 3,080 | 25.2 | 12.8 | .08 | 290 |
| 7 | 15.1 | 137 | 3,020 | 20.0 | 7.1 | .08 | 260 |
| 8 | 13.5 | 86 | 2,700 | 8.4 | 4.7 | .07 | 265 |
| 8A | 12.0 | 114 | 2,400 | 11.5 | 7.0 | .09 | 240 |
| 9 | 9–9.5 | 65–68 | 2,430–2,560 | 5.2 | 4.4 | .3–.4 | 280 |
| 10 | 10.6 | 103 | 2,860 | 9.2 | 6.4 | .3 | 257 |
| 11 | 20–23 | 164–188 | 4,000–4,600 | 17.6 | 6.1 | .1 | 234–270 |
| 12 | 24.5 | 196 | 4,900 | 17.5 | 5.2 | .09 | 240 |
| 12A | 19.5 | 187 | 3,900 | 20 | 7.8 | .08 | 215 |
| 13 | 20 | 196 | 4,000 | 17.0 | 6.6 | .08 | 265 |

L=Leakage, microampere/gm.
C=Capacitance, microfarads/gm.
Df=Dissipation factor, percent.
CV=Capacitance volts in microfarad volts/gr.
C¹=Capacitance, microfarads/cc.
ESR=Equivalent series resistance, ohm.
BDV=Breakdown voltage, volts.

As can be seen from a study of Tables I and II, the present invention provides for the production of capacitors having properties unobtainable by other techniques. When extremes of reliability are the objective, along with reasonably high capacitance, the higher sintering temperatures of Examples 4 and 5 are preferred. When the ultimate in capacitance per volume and capacitance per gram is the objective, the relatively lower sintering temperatures of Examples 11, 12 and 13 are preferred.

Particular attention should be given to certain advantages which can be obtained by the process of the present invention as applied to different types of tantalum powder. In this connection, Example 3 employs an expensive powder ($45/#) prepared by hydriding and grinding tantalum chips. This gives a high reliability, high capacitance anode when sintered at 2150° C. In Example 4, the lower priced directly reduced powder ($31/#) when sintered at 2350° C. for 45 minutes gives an anode having slightly higher capacitance per unit volume, lower dissipation factor, lower ESR and equivalent L/C. The only disadvantage in the use of this less expensive powder is in the breakdown voltage of Example 4 which is 255 as compared with above 300 volts for Example 3. This same powder is used in Example 8, sintered at 2150° and is compared with the same powder formed into an anode by conventional techniques as described in 8A. In this connection, the anode of Example 8 has a CV which is substantially greater than the CV of the conventional anode (8A) the Df is substantially less, as is the ESR, while the other properties are equivalent. A comparison between Examples 5 and 5A shows the great improvement in anode obtained applying the present invention to a hydrided and ground product. As noted, the electrical properties of the anode of Example 5 are greatly superior to those of Example 5A, which is formed by conventional techniques. Similary, Example 12 should be compared with Example 12A wherein an anode formed in the present invention 12 is compared with an anode made by conventional techniques in 12A. The anode of the present invention has greatly superior electrical properties, as can be seen.

While several preferred embodiments have been described above, they should be taken as illustrative of the invention rather than as being limiting. In this connection, it is certainly not necessary to use a tantalum mold. The mold can be formed merely with a tantalum foil lining, or it can even embody the use of graphite, alundum, zirconia and other refractory materials. It is particularly important when in using materials other than tantalum in contact with the powder, to limit the initial sintering temperatures to between 1400 and 1500° C. to prevent contamination of the tantalum powder.

Since certain changes may be made in the above product and process without departing from the scope of the invention herein involved, it is intended that all matter contained in the above description shall be interpreted as illustrative and not in a limiting sense.

What is claimed is:

1. The process of forming an anode for an electrical capacitor which comprises the steps of introducing tantalum powder into a mold to provide a loosely disposed mass of said powder having no cohesive strength and a bulk density of about 3 to 6 grams/cc., said powder having an average particle diameter of less than 10 microns, heating said powder to form a coherent self-supporting pellet, removing said pellet from said mold and further vacuum sintering said pellet at a temperature of about 1875° C. and above to form a high-capacitance, low-leakage sintered anode.

2. The process of forming an anode for an electrical capacitor which comprises the steps of introducing tantalum powder into a mold to provide a loosely disposed mass of said powder having no cohesive strength and a bulk density of about 3 to 6 grams/cc., said powder having an average particle diameter of 4 to 6 microns, heating said powder to form a coherent self-supporting pellet, removing said pellet from said mold and further vacuum sintering said pellet at a temperature of about 1875° C. and above to form a high-capacitance, low-leakage sintered anode.

3. The process of forming an anode for an electrical capacitor which comprises the steps of introducing tantalum powder into a mold, heating said powder to form a coherent self-supporting pellet, removing said pellet from said mold and further vacuum sintering said pellet at a temperature of about 1875° C. and above to form a high-capacitance, low-leakage sintered anode, said sintering step being conducted at a temperature of about 1875°–1950° C. for about 30 minutes to form an anode having a capacitance in excess of 4000 μ fv./gr.

References Cited

UNITED STATES PATENTS

| | | | |
|---|---|---|---|
| 2,198,702 | 4/1940 | Koehring | 15—22 |
| 2,299,228 | 10/1942 | Gray et al. | 317—230 |
| 3,004,332 | 10/1961 | Werner | 317—230 |
| 3,093,883 | 6/1963 | Haring et al. | 317—230 |

FOREIGN PATENTS 511.805  8/1939  Great Britain.

JAMES D. KALLAM, Primary Examiner

U.S. Cl. X.R.

317—230